(12) United States Patent
Konagai et al.

(10) Patent No.: US 8,946,342 B2
(45) Date of Patent: *Feb. 3, 2015

(54) RANDOM MAT AND FIBER-REINFORCED COMPOSITE MATERIAL

(71) Applicant: Teijin Limited, Osaka-shi, Osaka (JP)

(72) Inventors: Yuhei Konagai, Matsuyama (JP);
Naoaki Sonoda, Matsuyama (JP);
Noboru Okimoto, Matsuyama (JP);
Katsuyuki Hagihara, Matsuyama (JP)

(73) Assignee: Teijin Limited, Osaka-shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/956,417

(22) Filed: Aug. 1, 2013

(65) Prior Publication Data

US 2013/0317161 A1 Nov. 28, 2013

Related U.S. Application Data

(63) Continuation of application No. PCT/JP2011/070314, filed on Aug. 31, 2011.

(30) Foreign Application Priority Data

Feb. 1, 2011 (JP) .................................. 2011-019891

(51) Int. Cl.
| | | |
|---|---|---|
| *C08K 3/04* | (2006.01) | |
| *D04H 1/4242* | (2012.01) | |
| *B29B 11/16* | (2006.01) | |
| *B29C 70/12* | (2006.01) | |
| *C08J 5/04* | (2006.01) | |
| *B29C 43/22* | (2006.01) | |
| *D04H 1/60* | (2006.01) | |
| *D04H 1/732* | (2012.01) | |

(52) U.S. Cl.
CPC . *C08K 3/04* (2013.01); *B29C 70/12* (2013.01); *B29C 43/222* (2013.01); *D04H 1/60* (2013.01); *D04H 1/4242* (2013.01); *B29B 11/16* (2013.01); *C08J 5/042* (2013.01); *D04H 1/732* (2013.01); *C08J 2300/22* (2013.01)
USPC ............................ 524/495; 264/115; 264/319

(58) Field of Classification Search
CPC ............ C08K 3/04; C08K 7/02; B29C 70/00; B29C 70/12; B29C 70/18; C08J 5/042
USPC .................... 524/495; 264/115, 319
See application file for complete search history.

(56) References Cited

U.S. PATENT DOCUMENTS

| | | | | |
|---|---|---|---|---|
| 4,356,228 | A | * 10/1982 | Kobayashi et al. | ........... 428/327 |
| 2011/0143110 | A1 | 6/2011 | Tsuchiya et al. | |
| 2013/0344282 | A1* | 12/2013 | Yagi et al. | ...................... 428/113 |
| 2014/0080961 | A1* | 3/2014 | Konagai et al. | ............... 524/495 |

FOREIGN PATENT DOCUMENTS

| | | |
|---|---|---|
| EP | 1134314 A1 | 9/2001 |
| EP | 1988118 A1 | 11/2008 |
| EP | 2530124 A1 | 12/2012 |
| EP | 2669081 A1 | 12/2013 |
| JP | S57-117661 A | 7/1982 |
| JP | EP 0483716 A1 * | 10/1991 |
| JP | H04-163109 | * 6/1992 |
| JP | H04-163109 A | 6/1992 |
| JP | H05-132568 A | 5/1993 |
| JP | 05-162130 A | 6/1993 |
| JP | 06-099431 | 12/1994 |
| JP | H11-029368 A | 2/1999 |
| JP | 2002-212311 A | 7/2002 |
| JP | 2004-043985 A | 2/2004 |
| JP | 2006-077343 | 3/2006 |
| JP | 2007-084649 A | 4/2007 |
| JP | 2008-174605 A | 7/2008 |
| JP | 2008-254191 A | 10/2008 |
| JP | 2009-013305 A | 1/2009 |
| JP | 2009-114611 A | 5/2009 |
| JP | 2009-114612 A | 5/2009 |
| JP | 2009-132810 A | 6/2009 |

(Continued)

OTHER PUBLICATIONS

Torayca T300 Data Sheet—Published Nov. 26, 2002 (http://www.toraycfa.com/pdfs/t300datasheet.pdf).*

(Continued)

*Primary Examiner* — Ling Choi
*Assistant Examiner* — Ronald Grinsted
(74) *Attorney, Agent, or Firm* — Banner & Witcoff, Ltd.

(57) ABSTRACT

There is provided a random mat of the present invention including: reinforcing fibers having an average fiber length of 5 to 100 mm; and a thermoplastic resin, wherein a fiber areal weight of the reinforcing fibers is from 25 to 3,000 g/m², for a reinforcing fiber bundle (A) including the reinforcing fibers equivalent to or more than a critical single fiber number defined by formula (1), a ratio of the reinforcing fiber bundle (A) to a total amount of the reinforcing fibers in the mat is from 30 vol % to less than 90 vol %, and an average number (N) of the reinforcing fibers in the reinforcing fiber bundle (A) satisfies formula (2):

Critical single fiber number=$600/D$     (1)

$0.7 \times 10^4/D^2 < N < 1 \times 10^5/D^2$     (2)

wherein D is an average fiber diameter (μm) of single reinforcing fibers.

5 Claims, 4 Drawing Sheets

(56) References Cited

FOREIGN PATENT DOCUMENTS

| JP | 2010-037358 A | 2/2010 |
|----|---------------|--------|
| JP | 2010-235779 A | 10/2010 |
| JP | 2011-241338 A | 1/2011 |
| JP | 2011-178890 A | 9/2011 |
| JP | 2011-178891 A | 9/2011 |

OTHER PUBLICATIONS

Office Action in Japanese counterpart Application No. 2010-044287, issued on Dec. 17, 2013.
International Search Report issued in corresponding International Application No. PCT/JP2011/070314 mailed Dec. 20, 2011.
International Preliminary Report on Patentability received in corresponding Japanese Patent Application No. PCT/JP2011/070314 issued Aug. 1, 2013.
Office Action mailed Jan. 8, 2014 in corresponding Korean Application 10-2013-7020282.
Notification of Information Offer dispatched on Apr. 8, 2014 in related Japanese patent application 2010-044287.
Supplementary European Search Report in corresponding EP Application No. 11857745.1 issued Apr. 22, 2014.
Office Action for corresponding EP Application No. 11857745.1 dated May 8, 2014.
Decision of Refusal issued on May 8, 2014 in corresponding Korean Application 10-2013-7020282.

* cited by examiner

RANDOM MAT AND FIBER-REINFORCED COMPOSITE MATERIAL

CROSS REFERENCE TO RELATED APPLICATION

This is a continuation of International Application No. PCT/JP2011/070314 filed on Aug. 31, 2011, and claims priority from Japanese Patent Application No. 2011-019891, filed on Feb. 1, 2011, the entire disclosures of which are incorporated herein by reference.

TECHNICAL FIELD

The present invention relates to a random mat usable as a preform of a fiber-reinforced composite material shaped product, and a fiber-reinforced composite material obtained therefrom.

BACKGROUND ART

Fiber-reinforced composite materials in which carbon fibers, aramid fibers, glass fibers or the like are used as reinforcing fibers have been widely utilized for structural materials, such as aircraft and automobiles, and general industry or sports use, such as tennis rackets, golf club shafts and fishing rods, utilizing high specific strength and specific elasticity modulus thereof. As forms of the reinforcing fibers, there are woven fabrics produced by using continuous fibers, UD sheets in which the fibers are aligned unidirectionally, random sheets produced by using cut fibers, nonwoven fabrics and the like.

Generally, in case of the fabrics made of the continuous fibers, the UD sheets and the like, complicated layering steps such as layering at various angles, for example, at 0/+45/−45/90, because of anisotropy of the fibers, and further plane-symmetrical layering for preventing warpage of shaped products, have become one of the factors that increase the cost of the fiber-reinforced composite materials.

Accordingly, a relatively inexpensive fiber-reinforced composite material can be obtained by using a previously isotropic random mat. This random mat can be obtained by a spray-up (dry production method) wherein spraying cut reinforcing fibers alone or spraying the cut fibers together with a thermosetting resin are performed at the same time into a mold, or a paper-manufacturing (wet method) of adding previously cut reinforcing fibers into an aqueous slurry containing a binder, and followed by paper-making process. Use of the dry production method can provide the random mat more inexpensively, because an apparatus is relatively small in size.

As the dry production method, there is commonly used a technique of cutting continuous fibers and concurrently spraying the cut fibers, and a rotary cutter is used in many cases. However, when the distance between blades of the cutter is increased in order to lengthen the fiber length, the cut frequency decreases, and thereby results in discontinuous discharge of the fibers from the cutter. For this reason, the uneven fiber areal weight of the mat locally occurs. In particular, when the mat having a low fiber areal weight of fibers is prepared, the unevenness in thickness becomes significant, which has caused a problem of deteriorated surface appearance.

On the other hand, another factor that increases the cost of the fiber-reinforced composite materials is that the molding time is long. Usually, the fiber-reinforced composite material is obtained by heating and pressurizing a material called a prepreg in which a reinforcing fiber base material is previously impregnated with a thermosetting resin, using an autoclave for 2 hours or more. In recent years, an RTM molding method has been proposed in which a base material of reinforcing fibers not impregnated with a resin is set in a mold, and thereafter, a thermosetting resin is poured thereinto, and the molding time has been substantially reduced. However, even when the RTM molding method is adopted, it takes 10 minutes or more until one part is molded.

For this reason, a composite material using a thermoplastic resin as a matrix, instead of the conventional thermosetting resin, is attracting attention. However, the thermoplastic resin generally has high viscosity compared to the thermosetting resin, so that the time to impregnate the molten resin into the fiber base material becomes long. As a result, there has been a problem that the takt time until molding increases.

As a technique for solving these problems, there is proposed a technique called thermoplastic stamping molding (TP-SMC). This is a molding method in which chopped fibers previously impregnated with a thermoplastic resin are heated to a melting point or more or a flowable temperature or more of the resin and put into a part of a mold, thereafter immediately the mold is closed, and the fibers and the resin are allowed to flow in the mold, thereby obtaining a product shape, followed by cooling to form a shaped product. According to this technique, molding is possible for such a short period of time as about 1 minute by using the fibers previously impregnated with the resin. There are Patent Documents 1 and 2 with respect to methods for producing chopped fiber bundles and molding materials. However, these are methods using molding materials as called SMC or stampable sheets. In such thermoplastic stamping molding, the fibers and the resin are allowed to flow in the mold, so that there have been problems of failing to produce a thin-walled one and fiber orientation is disturbed as the orientation becomes beyond control.

As a means for producing the thin-walled one without allowing the fibers to flow, there is proposed a technique of preparing a thin sheet from reinforcing fibers by a paper-making method, and thereafter, impregnating the sheet with a resin to prepare a prepreg (Patent Document 3). In the paper-making method, the reinforcing fibers are homogeneously dispersed in an aqueous dispersion, so that the reinforcing fibers are in single fiber form.

(Patent Document 1) JP-A-2009-114611
(Patent Document 2) JP-A-2009-114612
(Patent Document 3) JP-A-2010-235779

DISCLOSURE OF THE INVENTION

Problems that the Invention is to Solve

Problems to be solved by the invention relate to a random mat used as a preform of a fiber-reinforced composite material shaped product and a fiber-reinforced composite material obtained therefrom. The random mat of the invention is characterized in that a thermoplastic matrix resin can be easily impregnated in reinforcing fiber bundles and among single fibers of the reinforcing fibers in the random mat, and thereby being able to provide a fiber-reinforced composite material which is thin in thickness and excellent in mechanical physical properties.

Means for Solving the Problems

In the invention, it has been found that a thermoplastic matrix resin can be easily impregnated by forming a random mat including a thermoplastic resin and reinforcing fibers satisfying specific bundling or opening conditions, which makes it possible to suitably provide a fiber-reinforced composite material, thus leading to the invention. That is to say, the invention is:

a random mat characterized in that the fiber areal weight of reinforcing fibers with an average fiber length of 5 to 100 mm is from 25 to 3,000 g/m², and is constituted by a reinforcing fiber bundle (A) comprising plural fibers equal to or more than the critical single fiber number defined by formula (1), the ratio thereof to the total amount of fibers in the mat is from 30 vol % or more and less than 90 vol %, and that the average number (N) of the single fibers in the reinforcing fiber bundle (A) satisfies the following formula (2):

$$\text{Critical single fiber number} = 600/D \quad (1)$$

$$0.7 \times 10^4/D^2 < N < 1 \times 10^5/D^2 \quad (2)$$

wherein D is the average fiber diameter (μm) of single reinforcing fibers;
a method for producing the random mat; and
a fiber-reinforced composite material obtained therefrom.

Advantages Effect of the Invention

The random mat of the invention is preferably usable as a preform for preparing a shaped fiber-reinforced composite material, and a fiber-reinforced composite material excellent in surface appearance quality can be provided thereby. Further, a fiber-reinforced composite material excellent in reduction in thickness and isotropy can be provided by using the random mat of the invention as the preform. The random mat of the invention, therefore, can be used as the preform for various constituent members, for example, inner plates, outer plates and constituent members of automobiles, various electric appliances, frames and boxes of machines, and the like.

BEST MODE FOR CARRYING OUT THE INVENTION

Exemplary embodiments of the invention will be described below in turn.
[Random Mat]
The random mat of the invention includes reinforcing fibers having an average fiber length of 5 to 100 mm and a thermoplastic resin, a fiber areal weight of the reinforcing fibers in the mat is from 25 to 3,000 g/m², for a reinforcing fiber bundle (A) comprising single fibers equal to or more than the critical single fiber number defined by formula (1), the ratio thereof to the total amount of fibers in the mat is from 30 vol % to less than 90 vol %, and the average number (N) of the fibers in the reinforcing fiber bundle (A) satisfies the following formula (2):

$$\text{Critical single fiber number} = 600/D \quad (1)$$

$$0.7 \times 10^4/D^2 < N < 1 \times 10^5/D^2 \quad (2)$$

wherein D is the average fiber diameter (μm) of the single reinforcing fibers.

In a plane of the random mat, the reinforcing fibers are not oriented in a specific direction, and are spread and arranged in random directions.

The random mat of the invention is an in-plane isotropic material. When a shaped product is obtained from the random mat, isotropy of the reinforcing fibers in the random mat is also maintained in the shaped product. Isotropy of the random mat and the shaped product therefrom can be quantitatively evaluated by obtaining the shaped product from the random mat and determining the ratio of tensile modulus in two directions at right angles to each other. As to values of the tensile modulus in two directions, when the ratio obtained by dividing a larger one by a smaller one does not exceed 2, it is evaluated as being isotropic. When the ratio does not exceed 1.3, it is evaluated as being excellent in isotropy.

The fiber areal weight of the reinforcing fibers in the random mat is within the range of 25 to 3,000 g/m². The random mat is useful as a prepreg, and various densities can be selected according to desired molding.
[Reinforcing Fiber]
The reinforcing fibers composing the random mat are discontinuous, and contain reinforcing fibers having a certain range of fiber length, thereby being able to develop a reinforcement function. The fiber length is expressed by the average fiber length determined by measuring the fiber length of the reinforcing fibers in the random mat obtained. Methods for measuring the average fiber length include a method of measuring the fiber length of 100 fibers randomly extracted, down to the order of millimeter, using a caliper or the like, and calculating the average thereof.

The average fiber length of the reinforcing fibers in the random mat of the invention is from 5 to 100 mm, preferably from 10 to 100 mm, more preferably from 15 to 100 mm, and still more preferably from 15 to 80 mm. Furthermore, it is most preferably from 20 to 60 mm.

When the reinforcing fibers are cut to a certain length to produce the random mat by a preferred cutting method described later, the average fiber length of fibers in the mat becomes approximately equivalent to the cut fiber length.

The reinforcing fibers composing the random mat are preferably at least one selected from the group consisting of carbon fibers, aramid fibers and glass fibers. These may also be used together, and above all, however, the carbon fibers are preferred in that a composite material light in weight with excellent in strength can be provided. In the case of the carbon fibers, the average fiber diameter is preferably from 3 to 12 μm, and more preferably from 5 to 7 μm.

As the reinforcing fibers, there are preferably used ones with a sizing agent adhered thereto, and the sizing agent is preferably from more than 0 to 10 parts by weight based on 100 parts by weight of the reinforcing fibers.
[Degree of Fiber Opening]
The random mat of the invention is characterized in that it is constituted by a reinforcing fiber bundle (A) comprising reinforcing fibers of at least the critical single fiber number defined by formula (1), the ratio of the fiber bundle to the total amount of the fibers in the mat is from 30 vol % to less than 90 vol %;

$$\text{Critical single fiber number} = 600/D \quad (1)$$

wherein D is the average fiber diameter (μm) of the single reinforcing fibers. In the mat, single fibers or fiber bundles each comprising single fibers less than the critical single fiber number is present as the reinforcing fibers other than the reinforcing fiber bundles (A).

That is to say, in the random mat of the invention, the existing amount of the reinforcing fiber bundles (A) comprising single fibers more than or equal to the critical single fiber number defined by formula (1), which is depending on the average fiber diameter, is adjusted to 30 vol % to less than 90 vol %. In another word, the degree of fiber opening of the reinforcing fiber bundles is controlled to contain the particular fiber bundles of single fibers equal to or more than the specific fiber number and the opened reinforcing fibers other than those at the specific ratio. In order to adjust the existing amount of the reinforcing fiber bundles to 30 vol % or more and less than 90 vol %, control can be performed, for example, with the pressure of air blown in a fiber opening step, or the like. Further, control can also be performed by adjusting the size, for example, the width or the fiber number per width of the bundle, of a fiber bundle to be subjected to a cutting step. Specific examples thereof include a method of widening the width of the fiber bundle by extending means or the like, followed by subjecting to the cutting step, and a method of providing a slitting step before the cutting step, and further include a method of cutting the fiber bundle by using a so-called fiber separating knife in which many short blades are arranged, and a method of slitting and concurrently cutting the fiber bundle. Preferred conditions will be described below in the section of the fiber opening step.

In the case where the ratio of the reinforcing fiber bundles (A) to the total amount of fibers is less than 30 vol %, it becomes difficult to obtain a fiber-reinforced composite material excellent in mechanical physical properties when the random mat of the invention is molded, although there is an advantage that a composite material excellent in surface appearance quality is obtained. In the case where the ratio of the reinforcing fiber bundles (A) is 90 vol % or more, entangled portions of the fibers become locally thick, resulting in failure to obtain a thin-walled article. This defeats the purpose of the invention. The ratio of the reinforcing fiber bundles (A) is more preferably from 30 vol % to less than 80 vol %.

Further, the average number (N) of the single fibers in the reinforcing fiber bundles (A) each comprising the fibers equal to or more than the critical single fiber number satisfies the following formula (2):

$$0.7 \times 10^4/D^2 < N < 1 \times 10^5/D^2 \quad (2)$$

wherein D is the average fiber diameter (μm) of the single reinforcing fibers. Above all, the average number (N) of fibers in the reinforcing fiber bundles (A) each comprising single fibers equal to or more than the critical single fiber number is preferably less than $6 \times 10^4/D^2$. In order to adjust the average number (N) of fibers in the reinforcing fiber bundles (A) to the above-mentioned range, control can also be performed by adjusting the size, for example, the width of the bundle or the fiber number per width of the fiber bundle, to be subjected to a cutting step, in a preferred production method described later. Specific examples thereof include a method of widening the width of the fiber bundle by fiber extending or the like, followed by subjecting to the cutting step, and a method of providing a slitting step before the cutting step. Further, the fiber bundle may be slit at the same time as being cut.

Furthermore, it is also possible to control the average number (N) of fibers in the reinforcing fiber bundles (A) by adjusting the degree of opening of the cut fiber bundle with the pressure of air blown in the fiber opening step, or the like. Preferred conditions will be described in the sections of the fiber opening step and the cutting step.

Specifically, when the average fiber diameter of carbon fibers composing the random mat is from 5 to 7 μm, the critical single fiber number is from 86 to 120. When the average fiber diameter of carbon fibers is 5 μm, the average number of fibers in the fiber bundles is within the range of from more than 280 to less than 4,000. Above all, it is preferably from 600 to 2,500, and more preferably from 600 to 1,600. When the average fiber diameter of carbon fibers is 7 μm, the average number of fibers in the fiber bundle is within the range of from more than 142 to less than 2,040. Above all, it is preferably from 300 to 1,500, and more preferably from 300 to 800.

When the average number (N) of fibers in the reinforcing fiber bundles (A) is $0.7 \times 10^4/D^2$ or less, it becomes difficult to obtain a composite material having high fiber volume content (Vf). Further, when the average number (N) of fibers in the reinforcing fiber bundles (A) is $1 \times 10^5/D^2$ or more, thick portions locally may occur in composite materials, which is liable to cause voids.

When a composite material having a thin thickness of 1 mm or less is intended to be obtained, use of fibers only simply spread results in a large unevenness in fiber areal weight to fail to obtain good physical properties. Further, when all fibers are opened, it may be easy to obtain a thinner one. However, entanglement of fibers increases to fail to obtain one having a high fiber volume content. It becomes possible to obtain the random mat which is thin in thickness and excellent in physical properties obtained, by a random mat in which the reinforcing fiber bundles (A) each constituted by single fibers equal to or more than the critical single fiber number defined by formula (1) and reinforcing fibers (B) in a state of individual single fibers or thinner fiber bundles comprising single fibers less than the critical single fiber number are present at the same time.

It is possible to adjust the random mat of the invention to various thicknesses, and by using this one as a preform, a thin-walled shaped product having a thickness of about 0.2 to 1 mm can also be suitably obtained. That is to say, according to the invention, the random mat tailored to the thickness of various desired shaped products can be prepared, and is useful as a preform for a thin shaped product, particularly such as a surface layer of a sandwich material.

[Thermoplastic Resin]

The random mat of the invention contains a solid thermoplastic resin, and becomes a preform for obtaining a fiber-reinforced composite material. In the random mat, the thermoplastic resin is preferably present in fibrous and/or particulate form. The reinforcing fibers and the thermoplastic resin in fibrous and/or particulate form are present in a mixed state, which makes it unnecessary to allow the reinforcing fibers and the resin to flow in a mold, and the thermoplastic resin can be easily impregnated in the reinforcing fiber bundles and spaces between single fibers of the reinforcing fibers at the time of molding. The thermoplastic resin is preferably formed in fibrous and/or particulate form. Two or more kinds of thermoplastic resins may be used, and further, fibrous and particulate ones may be used together.

In the case of fibrous resin form, the fineness thereof is preferably from 100 to 5,000 dtex, and more preferably from 1,000 to 2,000 dtex. The average length thereof is preferably from 0.5 to 50 mm, and more preferably from 1 to 10 mm.

In the case of particulate form, there is preferably exemplified a spherical form, a strip form or a cylindrical form such as a pellet. In the case of spherical form, there is preferably enumerated a body of revolution of a perfect circle or an ellipse, or a shape such as egg form. In the case of spherical form, the average particle size is preferably from 0.01 to 1,000 μm, more preferably from 0.1 to 900 μm and still more preferably from 1 to 800 μm. Although there is no particular limitation on particle size distribution, sharp distribution is more preferred for the purpose of obtaining a thinner shaped product. However, desired particle size distribution obtained by an operation such as classification can be used.

In the case of a strip form, there is preferably enumerated a cylindrical form such as a pellet, a prismatic form or a scale form, and a rectangular form obtained by finely cutting a film is also preferred. In this case, a certain degree of aspect ratio may be allowed, but the preferred length thereof shall be considered to be in the same range as in the case of the above-mentioned fibrous form.

The kinds of the thermoplastic resins include, for example, a polyvinyl chloride resin, a polyvinylidene chloride resin, a vinyl acetate resin, a polyvinyl alcohol resin, a polystyrene resin, an acrylonitrile-styrene resin (AS resin), an acrylonitrile-butadiene-styrene resins (ABS resin), an acrylic resin, a methacrylic resin, a polyethylene resin, a polypropylene resin, a polyamide 6 resin, a polyamide 11 resin, a polyamide 12 resin, a polyamide 46 resin, a polyamide 66 resin, a polyamide 610 resin, a polyacetal resin, a polycarbonate resin, a polyethylene terephthalate resin, a polyethylene naphthalate resin, a polybutylene terephthalate resin, a polybutylene naphthalate resin, a polyarylate resin, a polyphenylene ether resin, a polyphenylene sulfide resin, a polysulfone resin, a polyethersulfone resin, a polyether ether ketone resin, a polylactic acid resin and the like. These thermoplastic resins may be used either alone or in combination of a plurality thereof.

The existing amount of the thermoplastic resin in the random mat is preferably from 50 to 1,000 parts by weight based on 100 parts by weight of the reinforcing fibers. It is more preferably from 55 to 500 parts by weight based on 100 parts by weight of the reinforcing fibers, and still more preferably from 60 to 300 parts by weight based on 100 parts by weight of the reinforcing fibers.

[Other Agents]

The random mat of the invention may contain additives such as various fibrous or non-fibrous fillers made from organic or inorganic fibers, a flame retardant, a UV-resistant agent, a pigment, a release agent, a softening agent, a plasticizer and a surfactant, within the range not impairing the object of the invention.

[Production Method]

A method for preferably obtaining the random mat of the invention will be described below. The random mat of the invention is preferably produced by the following steps 1 to 4.

1. The step of cutting reinforcing fiber bundles,
2. The step of introducing the cut reinforcing fiber bundles into a tube, and opening a fiber bundle by blowing air thereto,
3. The application step of spreading and concurrently suctioning the opened reinforcing fibers, together with a fibrous or particulate thermoplastic resin, and spraying the reinforcing fibers and the thermoplastic resin, and
4. The step of fixing the reinforcing fibers and the thermoplastic resin which have been applied.

That is to say, the invention includes a method for producing a random mat including the above-mentioned steps 1 to 4. The respective steps will be described in detail below.

[Cutting Step]

Figure 1:
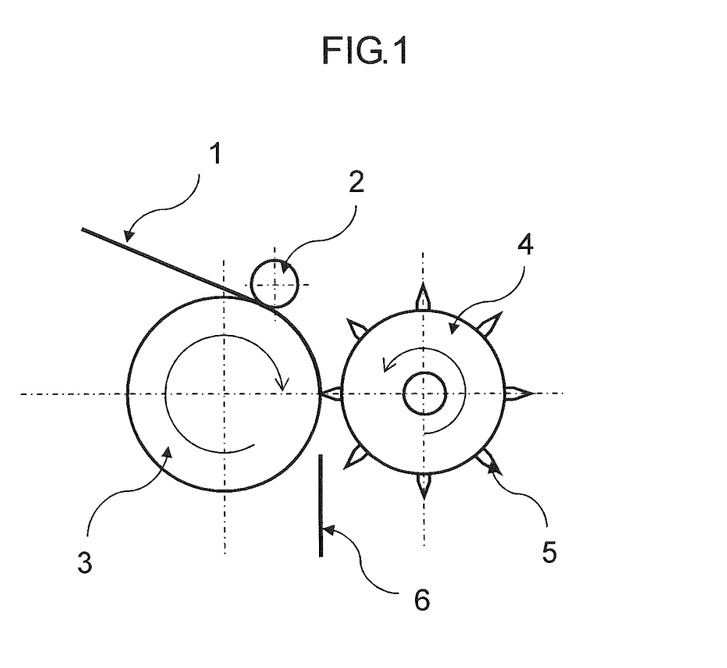
FIG. 1 is a schematic view showing a step for cutting a fiber bundle.
Figure 2:
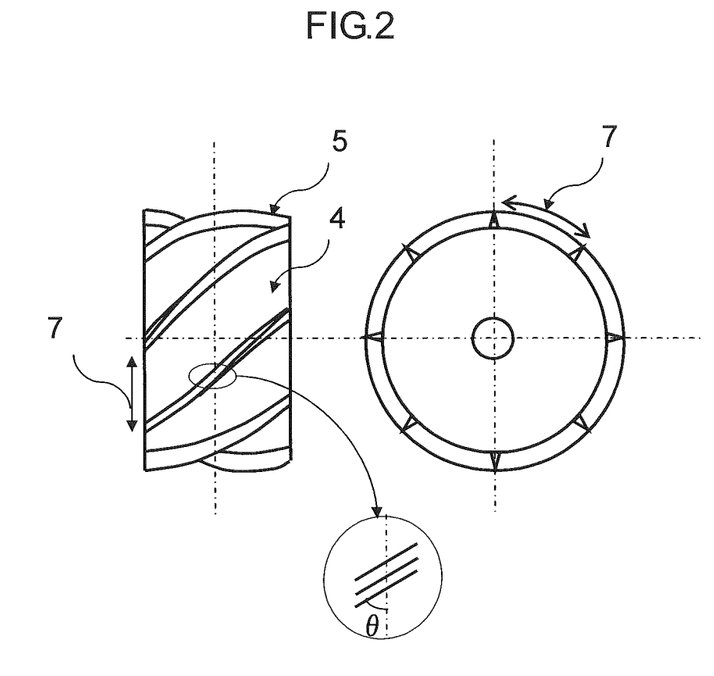
FIG. 2 is one example (front and cross-sectional schematic views) of a rotary spiral cutter.
Figure 3:
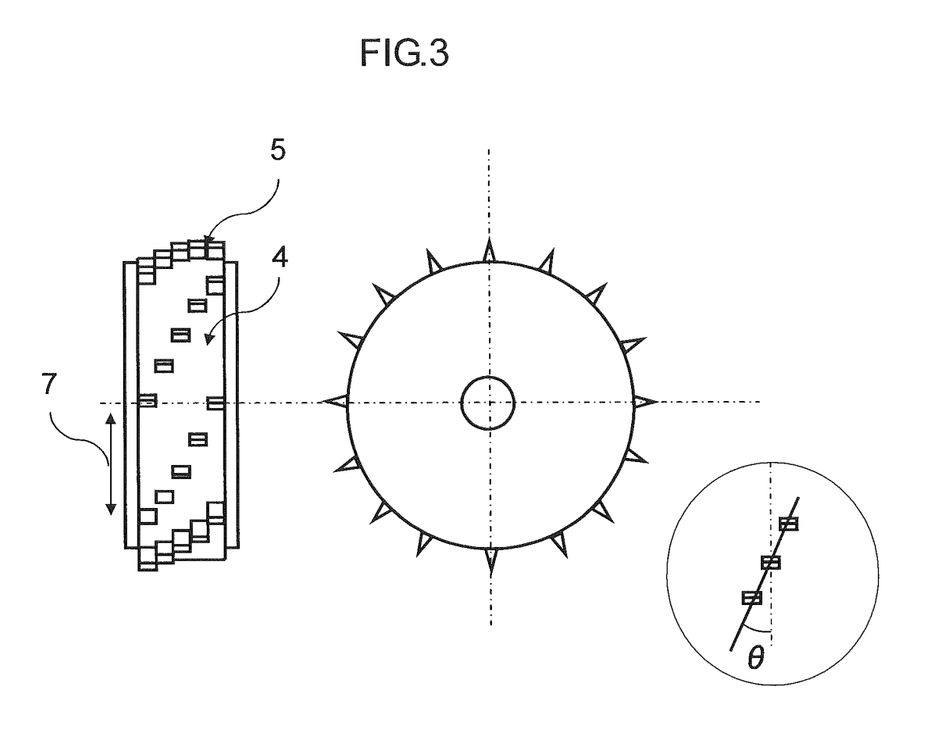
FIG. 3 is one example (front and cross-sectional schematic views) of a rotary fiber separating cutter.

A method for cutting the reinforcing fibers in the method of the invention is specifically the step of cutting the reinforcing fiber bundles by using a knife. As the knife used for cutting, there is preferred a rotary cutter or the like. As the rotary cutter, there is preferred one provided with a spiral knife or a so-called fiber separating knife in which many short blades are arranged. A specific schematic view of the cutting step is shown in FIG. 1. One example of the rotary cutter having the spiral knife is shown in FIG. 2, and one example of the rotary cutter having the fiber separating knife is shown in FIG. 3.

In order to adjust the average number (N) of fibers in the reinforcing fiber bundles (A) to the preferred range in the invention, control is preferably performed by adjusting the size of a fiber bundle, for example, the width of the bundle or the fiber number per width, to be subjected to the cutting step.

As the fiber bundle providing to the cutting step, the reinforcing fiber bundle previously having a fiber number within the range of formula (2) is preferably used. In general, however, the smaller the fiber bundle number is, the more expensive the fiber price becomes. So when the reinforcing fiber bundle having a high fiber number, which is inexpensively available, is used, the fiber bundle is preferably subjected to the cutting step after adjusting the width or the fiber number per width of the fiber bundle to be subjected to the cutting step. Specific examples thereof include a method of thinly spreading the fiber bundle by opening or the like to widen the width thereof, followed by subjecting to the cutting step, and a method of providing a slitting step of fiber bundles before the cutting step. In case of providing the previous slitting step, the fiber bundle is subjected to the cutting step after the fiber bundle has been previously fined by slitting. In such case, an ordinary flat blade, a spiral blade or the like having no special mechanism can be used as the cutter, accordingly, Further, examples thereof include a method of cutting the fiber bundle by using the fiber separating knife and a method of slitting the fiber bundle at the same time as cutting it by using a cutter having a slitting function.

In the case of using the fiber separating knife, the average number (N) of fibers can be decreased by using one having a narrow knife width, and conversely, the average number (N) of fibers can be increased by using one having a wide knife width.

Figure 4:
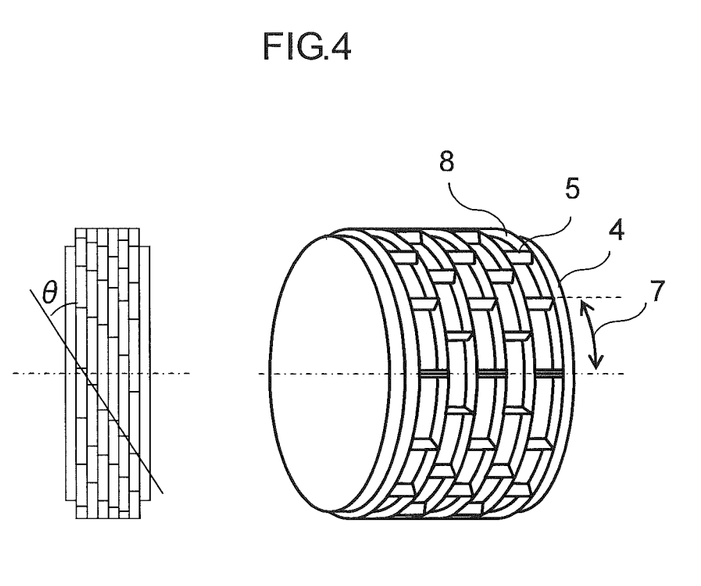
FIG. 4 is one example (front and perspective schematic views) of a cutter having blades parallel to a fiber direction.

Furthermore, as the cutter having the slitting function, an example of a fiber separating cutter with blades having the slitting function, which are parallel to a fiber direction, in addition to blades perpendicular to the fiber direction, is shown in FIG. 4. In the cutter of FIG. 4, short blades perpendicular to the fiber direction are spirally provided at certain intervals, and at the same time as being cut by these, the fibers can be slit by the blades parallel to the fiber direction.

In the fiber separating knife as shown in FIG. 2, blades parallel to the fiber direction may also be provided between the fiber separating knives.

In order to obtain the random mat for a fiber-reinforced thermoplastic resin, which is excellent in surface appearance quality, the local unevenness in fiber areal weight of fibers has a significant effect. According to a rotary cutter in which an ordinary flat blade is arranged, the fibers are discontinuously cut. When the fibers are introduced as such into the application step, the unevenness occurs in the mat. Accordingly, it is possible to produce a mat with a small unevenness in fiber areal weight of fibers by continuously cutting the fibers without interruption by using a knife with an angle defined. That is to say, for the purpose of continuously cutting the reinforcing fibers, the knife is preferably arranged on the rotary cutter regularly at a specific angle. The fibers are preferably cut in such a manner that the angle between a circumferential direction and an arranging direction of the blade satisfies the following formula (3):

$$\text{Pitch of blades} = \text{width of a reinforcing fiber strand} \times \tan(90-\theta) \quad (3)$$

wherein $\theta$ is the angle between the circumferential direction and the arranging direction of the knife.

The pitch of the blades in the circumferential direction is reflected as such in the fiber length of the reinforcing fibers.

FIGS. 2 to 4 are examples of the knives in which the angle is defined as described above, and the angle θ between the circumferential direction and the arranging direction of the knife in these cutters is shown in the figures.

[Fiber Opening Step]

The fiber opening step in the method of the invention is a step of opening a fiber bundle by introducing the cut reinforcing fiber bundles into a tube and blowing air to the fibers. The degree of fiber opening, the existing amount of the reinforcing fiber bundles (A) and the average number (N) of single fibers in the reinforcing fiber bundles (A) can be appropriately controlled by the pressure of air or the like. In the fiber opening step, the reinforcing fibers can be opened by directly blowing air to the fiber bundle at a wind velocity of 1 to 1,000 m/sec preferably through compressed air blowing holes. The wind velocity is preferably from 5 to 500 m/sec, and more preferably from more than 50 to 500 m/sec. Specifically, holes having a diameter of about 1 to 2 mm are made in several places in the tube through which the reinforcing fibers pass, and a pressure of 0.01 to 1.0 MPa, more preferably about 0.2 to 0.8 MPa, is applied from the outside to directly blow compressed air to the fiber bundle. The fiber bundle can be more remained by decreasing the wind velocity, and conversely, the fiber bundle can be opened to single fiber form by increasing the wind velocity.

[Application Step]

The application step in the method of the invention is constituted by steps of suctioning the opened reinforcing fibers, together with the fibrous or particulate thermoplastic resin, at the same time as spreading them, and spraying the reinforcing fibers and the thermoplastic resin at the same time. The opened reinforcing fibers and the fibrous or particulate thermoplastic resin are applied onto a sheet, specifically onto a breathable sheet mounted in a lower portion of a fiber opening machine, preferably at the same time.

In the application step, the supply amount of the thermoplastic resin is preferably from 50 to 1,000 parts by weight based on 100 parts by weight of the reinforcing fibers. The thermoplastic resin is more preferably from 55 to 500 parts by weight based on 100 parts by weight of the reinforcing fibers, and still more preferably from 60 to 300 parts by weight based on 100 parts by weight of the reinforcing fibers.

The reinforcing fibers and the fibrous or particulate thermoplastic resin are preferably sprayed so as to be two-dimensionally oriented herein. In order to apply the opened fibers while two-dimensionally orienting them, an application method and the following fixing method become important. In the application method of the reinforcing fibers, it is preferred to use a taper tube of a conical shape or the like. In the tube of a circular cone or the like, air is diffused to decrease the flow rate in the tube, and at this time, rotational force is given to the reinforcing fibers. The reinforcing fibers opened in the taper tube by utilizing this Venturi effect can be preferably spread and sprayed.

Further, the following fixing step and the application step may be performed at the same time, that is to say, the fibers may be fixed while being applied and deposited. It is preferred that the fibers are sprayed on a movable breathable sheet having a suction mechanism to deposit them in mat form, followed by fixing thereof in that state. In this case, when the breathable sheet is constituted by a conveyer comprising a net, and the fibers are deposited thereon while continuously moving it in one direction, the random mat can be continuously formed. Further, the breathable sheet may be moved back and forth and around, thereby achieving uniform deposition. Furthermore, it is also preferred that a leading edge of an application (spraying) unit of the reinforcing fibers and the thermoplastic resin is reciprocated in a direction perpendicular to the moving direction of the continuously moving breathable support, and thereby continuously performing the application and the fixing.

The reinforcing fibers and the thermoplastic resin are preferably uniformly sprayed without unevenness in the random mat.

[Fixing Step]

The fixing step in the method of the invention is a step of fixing the applied reinforcing fibers and thermoplastic resin. Preferably, air is suctioned from a lower portion of the breathable sheet to fix the fibers. The thermoplastic resin sprayed together with the reinforcing fibers is also fixed while being mixed, by air suction in the case of fibrous form or together with the reinforcing fibers even in the case of particulate form.

The highly two-dimensionally oriented mat can be obtained by suctioning from the lower portion through the breathable sheet. Further, the particulate or fibrous thermoplastic resin can be suctioned using negative pressure generated, and furthermore, easily mixed with the reinforcing fibers by diffusion flux generated in the tube. In the obtained material, the moving distance of the resin is short in an impregnating step by the presence of the thermoplastic resin in the vicinity of the reinforcing fibers, so that it is possible to impregnate the resin into the mat for a relatively short period of time. It is also possible to previously set a breathable nonwoven fabric or the like made of the same material as the matrix resin to be used to a fixing part as a breathable sheet, followed by spraying the reinforcing fibers and the particles onto the nonwoven fabric.

By the above-mentioned preferred production method of the random mat, there can be obtained the random mat made of fibers orientated two-dimensionally and containing few fibers whose long axes are three-dimensionally oriented.

The application step and the fixing step may be performed at the same time. Also, when the random mat is industrially produced, the application and the fixing are preferably performed at the same time while moving the breathable sheet. Further, it is also preferred that the leading edge of the application (spraying) unit of the reinforcing fibers and the thermoplastic resin is reciprocated in a direction perpendicular to the moving direction of the continuously moving breathable support, and thereby continuously performing the application and the fixing.

[Fiber-Reinforced Composite Material]

The random mat of the invention is molded as a preform, and thereby being able to obtain a fiber-reinforced composite material comprising the reinforcing fibers and the thermoplastic resin. As molding methods, press molding and/or thermoforming are preferred. The random mat of the invention is characterized by being easily impregnated with a thermoplastic resin, so that molding is performed by hot press molding or the like to be able to efficiently obtain the fiber-reinforced composite material. Specifically, it is preferred that the thermoplastic resin in the random mat is melted under pressure and impregnated in the reinforcing fiber bundles and spaces between the single fibers of the reinforcing fibers, followed by cooling to perform molding.

Thus, for example, the plate-like fiber-reinforced composite material can be efficiently obtained for a short period of time. The plate-like fiber-reinforced composite material is further useful as a prepreg for three-dimensional molding, particularly as a prepreg for press molding. Specifically, the shaped product can be obtained by so-called cold press in which the plate-like fiber-reinforced composite material sheet is heated to the melting point or higher, or to the glass transition temperature or higher of the resin, and one or a plurality of the sheets stacked in accordance with the shape of the shaped product to be obtained are put in a mold and kept at a temperature lower than the melting point or lower than the glass transition temperature of the resin, pressurized and thereafter cooled.

Alternatively, the shaped product can be obtained by so-called hot press in which the plate-like fiber-reinforced composite material is put into a mold, press molding is performed while elevating the temperature to the melting point or higher or to the glass transition temperature or higher, and then, the mold is cooled to a temperature lower than the melting point or lower than the glass transition temperature.

That is to say, the invention includes the fiber-reinforced composite material obtained from the random mat. As described above, in the random mat of the invention, the reinforcing fibers and the thermoplastic resin are mixed and present close to each other, so that thermoplastic resin can be easily impregnated without necessity of allowing the fibers and the resin to flow in the mold. Also in the fiber-reinforced composite material obtained from the random mat of the invention, it becomes possible to keep the configuration of the reinforcing fibers, that is, isotropy. Further, the degree of fiber opening of the reinforcing fibers in the random mat is also appropriately maintained in the fiber-reinforced composite material.

That is to say, the invention is preferably a composite material obtained from the above-mentioned random mat, which is characterized in that the composite material comprises reinforcing fibers having an average fiber length of more than 5 to 100 mm and a thermoplastic resin, the reinforcing fibers which are substantially two-dimensionally randomly oriented, that for reinforcing fiber bundles (A) each comprising single fibers equivalent to or more than the critical single fiber number defined by formula (1), the ratio thereof to the total amount of the fibers is from 30 vol % to less than 90 vol %, and that the average number (N) of single fibers in the reinforcing fiber bundles (A) satisfies the following formula (2):

$$\text{Critical single fiber number} = 600/D \quad (1)$$

$$0.7 \times 10^4/D^2 < N < 1 \times 10^5/D^2 \quad (2)$$

wherein D is the average fiber diameter (μm) of the single reinforcing fibers.

The average fiber length and fiber bundles of the reinforcing fibers in the composite material can be measured in the same manner as in the random mat, after the resin is removed from the composite material.

EXAMPLES

Examples are shown below, but the invention should not be construed as being limited thereto.

1) Analysis of Reinforcing Fiber Bundles in Random Mat

A random mat is cut out to a size of about 100 mm×100 mm.

Fiber bundles are all taken out with a tweezer from the mat which have been cut out, and the bundle number (I) of the reinforcing fiber bundles (A) and the length (Li) and weight (Wi) of the fiber bundles are measured and recorded. For fiber bundles which are small to such a degree that they cannot be taken out with tweezers, the weight (Wk) thereof is finally measured as a whole. For the measurement of the weight, a balance which is measurable down to 1/100 mg is used. From the fiber diameter (D) of the reinforcing fibers used in the random mat, the critical single fiber number is calculated, and division into the reinforcing fiber bundles (A) comprising single fibers equivalent to or more than the critical single fiber number and the others is performed. Incidentally, in the case where two or more kinds of reinforcing fibers are used, division is performed for each kind of fibers, and the measurement and the evaluation are performed for each.

A determination method the average number (N) of fibers in the reinforcing fiber bundles (A) is as follows. The fiber number (Ni) in each reinforcing fiber bundle is determined from the fineness (F) of the reinforcing fibers used, by the following formula:

$$Ni = Wi/(Li \times F)$$

The average number (N) of fibers in the reinforcing fiber bundles (A) is determined from the bundle number (I) of the reinforcing fiber bundles (A) by the following formula:

$$N = \Sigma Ni/I$$

The ratio (VR) of the reinforcing fiber bundles (A) to the total amount of fibers in the mat is determined using the fiber areal weight (ρ) of the reinforcing fibers by the following formula:

$$VR = \Sigma(Wi/\rho) \times 100/((Wk + \Sigma Wi)/\rho)$$

2) Analysis of Average Fiber Length of Reinforcing fibers Contained in Random Mat or Composite Material The lengths of 100 fibers randomly extracted from a random mat or a composite material were measured down to the millimeter with a caliper and a loupe and recorded. From the lengths (Li) of all reinforcing fibers measured, the average fiber length (La) was determined by the following formula. In the case of the composite material, after a resin was removed in a furnace at 500° C. for about 1 hour, the reinforcing fibers were extracted.

$$La = \Sigma Li/100$$

3) Reinforcing Fiber Bundle Analysis in Composite Material

For a molded plate, namely the reinforcing fiber composite material of the invention, after a thermoplastic resin is removed in a furnace at 500° C. for about 1 hour, measurement is performed in the same manner as the above-mentioned method in the random mat.

4) Analysis of Fiber Orientation in Composite Material

As a method for measuring isotropy of fibers after the composite material was molded, a tensile test on the basis of any direction of the molded plate and a direction perpendicular thereto was performed to measure the tensile modulus, and of the tensile modulus measured, the ratio (Eδ) of a larger one divided by a smaller one was measured. The nearer to 1 the ratio of the tensile modulus is, the more excellent in isotropy the material is. In these examples, when the ratio of the elasticity is 1.3 or less, it is evaluated as being excellent in isotropy.

Example 1

As reinforcing fibers, there were used a strand of carbon fibers, "Tenax" (registered trade mark) STS40-24KS (average fiber diameter: 7 μm, strand width: 10 mm) manufactured by Toho Tenax Co., Ltd., and the strand was widened to a width of 20 mm. As a cutting device, there was used a rotary cutter in which a spiral knife was arranged on a surface thereof, using a cemented carbide. At this time, θ in the following formula (3) was 63 degrees, and the pitch of blades was adjusted to 10 mm so as to cut the reinforcing fibers to a fiber length of 10 mm.

Pitch of blades=width of a reinforcing fiber strand×tan (90−θ)   (3)

wherein θ is the angle between the circumferential direction and the knife.

For preparing a fiber opening device, SUS 304-made nipples different in diameter were welded to prepare a double tube and small holes were made in an inner tube. Compressed air was supplied between the inner tube and an outer tube using a compressor. At this time, the wind velocity of air from the small holes was 450 m/sec. This tube was disposed just under the rotary cutter, and further, a taper tube was welded to a lower portion thereof. A matrix resin was supplied from a side face of the taper tube. As the matrix resin, there were used particles obtained by freeze-pulverizing pellets of a polycarbonate, "Panlite" (registered trade mark) L-1225L manufactured by Teijin Chemicals Ltd., followed by further classification through a 20 mesh and a 100 mesh. The average particle size of the polycarbonate powder was about 710 µm. Next, a table movable in XY directions was installed under an outlet of the taper tube, and suctioning was performed from a lower portion of the table with a blower. Then, the supply amount of the reinforcing fibers was set to 180 g/min, and the supply amount of the matrix resin was set to 480 g/min. The system was operated to obtain a random mat in which the reinforcing fibers and the thermoplastic resin were mixed. The configuration of the reinforcing fibers in the random mat was observed. As a result, fibers were randomly dispersed in the plane and the fiber axes were approximately parallel to a plane. The average fiber length of the reinforcing fibers of the resulting random mat was 10 mm, and the fiber areal weight of fibers was 200 g/m².

For the resulting random mat, the ratio of the reinforcing fiber bundles (A) and the average number (N) of fibers were examined. As a result, the critical single fiber number defined by formula (1) was 86. For the reinforcing fiber bundles (A), the ratio thereof to the total amount of fibers in the mat was 35%, and the average number (N) of fibers in the reinforcing fiber bundles (A) was 240. Further, the polycarbonate powder was dispersed among the reinforcing fibers in a state having no large unevenness.

The resulting random mat was heated in a press machine heated at 300° C., at 1 MPa for 3 minutes to obtain a molded plate (the fiber-reinforced composite material of the invention, hereinafter the molded plate) having a thickness of 0.6 mm. For the resulting molded plate, an ultrasonic inspection was performed. As a result, a non-impregnated portion or a void was not observed.

The tensile modulus of the resulting molded plate in 0-degree and 90-degree directions were measured. As a result, the ratio (Eδ) of the tensile modulus was 1.03, and fiber orientation was scarcely observed. Thus, the material in which isotropy was maintained could be obtained. Further, this molded plate was heated in a furnace at 500° C. for about 1 hour to remove the resin, and the average fiber length of the reinforcing fibers was determined. As a result, it was 10 mm. The resin was removed from the molded plate, and the ratio of the reinforcing fiber bundles (A) and the average number (N) of fibers were examined. As a result, the ratio of the reinforcing fiber bundles (A) to the total amount of fibers was 35%, and the average number (N) of fibers in the reinforcing fiber bundles (A) was 240. Differences from the above-mentioned measurement results of the random mat were not observed.

Example 2

As reinforcing fibers, there were used carbon fiber strands, "Tenax" (registered trade mark) IMS60-12K (average fiber diameter: 5 µm, strand width: 6 mm) manufactured by Toho Tenax Co., Ltd. As a cutting device, there was used a rotary cutter in which a spiral knife was arranged on a surface thereof, using a cemented carbide. As this rotary cutter, there was used a fiber separating cutter in which blades parallel to a fiber direction as shown in FIG. 4 were provided at 0.5-mm intervals, for the purpose of miniaturizing the fiber bundles. At this time, θ in the above-mentioned formula (3) was 17 degrees, and the pitch of blades was adjusted to 20 mm. The reinforcing fibers were cut to a fiber length of 20 mm. As a fiber opening device, a tube having small holes was prepared, and compressed air was supplied thereto using a compressor. The wind velocity of air from the small holes was adjusted to 150 m/sec. This tube was disposed just under the rotary cutter, and further, a taper tube was welded to a lower portion thereof. A matrix resin was supplied from a side face of the taper tube. As this matrix resin, there were used PA 66 fibers (T5 Nylon manufactured by Asahi Kasei Fibers Corp., fineness: 1,400 dtex) which were dry cut to 2 mm. Next, a table movable in XY directions was installed under an outlet of the taper tube, and suctioning was performed from a lower portion of the table with a blower. Then, the supply amount of the reinforcing fibers was set to 1,000 g/min, and the supply amount of the matrix resin was set to 3,000 g/min. The system was operated to obtain a random mat in which the reinforcing fibers and the polyamide were mixed. The configuration of the reinforcing fibers in the random mat was observed. As a result, the fiber axes of the reinforcing fibers were approximately parallel to a plane, and randomly dispersed in the plane. The average fiber length of the reinforcing fibers of the resulting random mat was 20 mm, and the fiber areal weight of fibers was 1,000 g/m².

For the resulting random mat, the ratio of the reinforcing fiber bundles (A) and the average number (N) of fibers were examined. As a result, the critical single fiber number defined by formula (1) was 120. For the reinforcing fiber bundles (A), the ratio thereof to the total amount of fibers in the mat was 86%, and the average number (N) of fibers in the reinforcing fiber bundles (A) was 900. Further, the nylon fibers were dispersed in the reinforcing fibers in a state having no large unevenness.

The resulting random mat was heated in a press machine heated at 280° C., at 1.0 MPa for 3 minutes to obtain a molded plate having a thickness of 3.2 mm. For the resulting molded plate, an ultrasonic inspection was performed. As a result, a non-impregnated portion or a void was not recognized.

The tensile modulus of the resulting molded plate in 0-degree and 90-degree directions were measured. As a result, the ratio (Eδ) of the elasticity was 1.07, and fiber orientation was scarcely observed. Thus, the material in which isotropy was maintained could be obtained. Further, this molded plate was heated in a furnace at 500° C. for about 1 hour to remove the resin, and the average fiber length of the reinforcing fibers was determined. As a result, it was 20 mm. The resin was removed from the molded plate, and the ratio of the reinforcing fiber bundles (A) and the average number (N) of fibers were examined. As a result, the ratio of the reinforcing fiber bundles (A) to the total amount of fibers was 86%, and the average number (N) of fibers in the reinforcing fiber bundles (A) was 900. Differences from the above-mentioned measurement results of the random mat were not observed.

Example 3

As reinforcing fibers, there were used glass fiber strands, EX-2500 (average fiber diameter: 15 µm, strand width: 9 mm) manufactured by Nippon Electric Glass Co., Ltd. As a cutting device, there was used a rotary cutter in which short blades in a 90-degree direction to the fibers were obliquely disposed and a fiber separating knife was arranged on a surface thereof, using a cemented carbide. The width of the knife was 1 mm, and further, blades parallel to a fiber direction were provided between the knives, for the purpose of miniaturizing the fiber bundles. At this time, θ in the above-mentioned formula (3) was 10 degrees, and the pitch of blades was adjusted to 50 mm. The reinforcing fibers were cut to a fiber length of 50 mm. As a fiber opening device, there was used the same device as used in Example 1. The wind velocity of air from the small holes was adjusted to 350 m/sec by decreasing the pressure of the compressor. This tube was disposed just under the rotary cutter, and further, a taper tube was welded to a lower portion thereof. A matrix resin was supplied from a side face of the taper tube. As this matrix resin, there was used a powder obtained by freeze-pulverizing pellets of a polycarbonate, "Panlite" (registered trade mark) L-1225L manufactured by Teijin Chemicals Ltd., followed by further classification through a 30 mesh and a 200 mesh. At this time, the average particle size thereof was about 360 μm. Next, a table movable in XY directions was installed under an outlet of the taper tube, and suctioning was performed from a lower portion of the table with a blower. Then, the supply amount of the reinforcing fibers was set to 300 g/min, and the supply amount of the matrix resin was set to 600 g/min. The system was operated to obtain a random mat in which the reinforcing fibers and the thermoplastic resin were mixed. The configuration of the reinforcing fibers in the random mat was observed. As a result, the fiber axes of the reinforcing fibers were approximately parallel to a plane, and randomly dispersed in the plane. The average fiber length of the reinforcing fibers of the resulting random mat was 50 mm, and the fiber areal weight of fibers was 300 g/m².

For the resulting random mat, the ratio of the reinforcing fiber bundles (A) and the average number (N) of fibers were examined. As a result, the critical single fiber number defined by formula (1) was 40. For the reinforcing fiber bundles (A), the ratio thereof to the total amount of fibers in the mat was 68%, and the average number (N) of fibers in the reinforcing fiber bundles (A) was 60. Further, the polycarbonate powder was dispersed in the reinforcing fibers in a state having no large unevenness.

This random mat was heated in a press machine heated at 300° C., at 1.0 MPa for 3 minutes to obtain a molded plate having a thickness of 0.6 mm. For the resulting molded plate, an ultrasonic inspection was performed. As a result, a non-impregnated portion or a void was not confirmed.

The tensile modulus of the resulting molded plate in 0-degree and 90-degree directions were measured. As a result, the ratio (Eδ) of the elasticity was 1.14, and fiber orientation was scarcely observed. Thus, the material in which isotropy was maintained could be obtained. Further, this molded plate was heated in a furnace at 500° C. for about 1 hour to remove the resin, and the average fiber length of the reinforcing fibers was determined. As a result, it was 50 mm. The resin was removed from the molded plate, and the ratio of the reinforcing fiber bundles (A) and the average number (N) of fibers were examined. As a result, differences from the above-mentioned measurement results of the random mat were not observed.

Example 4

As reinforcing fibers, there were used carbon fiber strands, "Tenax" (registered trade mark) STS40-24KS (average fiber diameter: 7 μm, strand width: 10 mm) manufactured by Toho Tenax Co., Ltd., which was opened to a width of 30 mm. As a cutting device, there was used a rotary cutter in which a spiral knife was arranged on a surface thereof, using a cemented carbide. At this time, θ in the above-mentioned formula (3) was 45 degrees, and the pitch of blades was adjusted to 30 mm so as to cut the reinforcing fibers to a fiber length of 30 mm. For preparing a fiber opening device, SUS 304-made nipples different in diameter were welded to prepare a double tube and small holes were made in an inner tube. Compressed air was supplied between the inner tube and an outer tube using a compressor. At this time, the wind velocity of air from the small holes was 200 m/sec. This tube was disposed just under the rotary cutter, and further, a taper tube was welded to a lower portion thereof. A matrix resin was supplied from a side face of the taper tube. As this matrix resin, there were used particles obtained by freeze-pulverizing pellets of a polycarbonate, "Panlite" (registered trade mark) L-1225L manufactured by Teijin Chemicals Ltd., followed by further classification through a 20 mesh and a 100 mesh. The average particle size of the polycarbonate powder was about 710 μm. Next, a table movable in XY directions was installed under an outlet of the taper tube, and suctioning was performed from a lower portion of the table with a blower. Then, the supply amount of the reinforcing fibers was set to 1,000 g/min, and the supply amount of the matrix resin was set to 1,100 g/min. The system was operated to obtain a random mat in which the reinforcing fibers and the thermoplastic resin were mixed. The configuration of the reinforcing fibers in the random mat was observed. As a result, the fiber axes of the reinforcing fibers were approximately parallel to a plane, and randomly dispersed in the plane. The average fiber length of the reinforcing fibers of the resulting random mat was 30 mm, and the fiber areal weight of fibers was 1,000 g/m².

For the resulting random mat, the ratio of the reinforcing fiber bundles (A) and the average number (N) of fibers were examined. As a result, the critical single fiber number defined by formula (1) was 86. For the reinforcing fiber bundles (A), the ratio thereof to the total amount of fibers in the mat was 60%, and the average number (N) of fibers in the reinforcing fiber bundles (A) was 1,620. Further, the polycarbonate powder was dispersed in the reinforcing fibers in a state having no large unevenness.

Three layers of the resulting random mat were stacked, and heated in a press machine heated at 300° C., at 1 MPa for 3 minutes to obtain a molded plate having a thickness of 1.5 mm. For the resulting molded plate, an ultrasonic inspection was performed. As a result, a non-impregnated portion or a void was not confirmed.

The tensile modulus of the resulting molded plate in 0-degree and 90-degree directions were measured. As a result, the ratio (Eδ) of the elasticity was 1.01, and fiber orientation was scarcely observed. Thus, the material in which isotropy was maintained could be obtained. Further, this molded plate was heated in a furnace at 500° C. for about 1 hour to remove the resin, and the average fiber length of the reinforcing fibers was determined. As a result, it was 30 mm. The resin was removed from the molded plate, and the ratio of the reinforcing fiber bundles (A) and the average number (N) of fibers were examined. As a result, differences from the above-mentioned measurement results of the random mat were not observed.

Example 5

As reinforcing fibers, there were used carbon fiber strands, "Tenax" (registered trade mark) STS40-24KS (average fiber diameter: 7 µm, strand width: 10 mm) manufactured by Toho Tenax Co., Ltd., which was opened to a fiber width of 20 mm. As a cutting device, there was used a rotary cutter in which a spiral knife was arranged on a surface thereof, using a cemented carbide. At this time, θ in the above-mentioned formula (3) was 68 degrees, and the pitch of blades was adjusted to 8 mm so as to cut the reinforcing fibers to a fiber length of 8 mm. For preparing a fiber opening device, SUS 304-made nipples different in diameter were welded to prepare a double tube and small holes were made in an inner tube. Compressed air was supplied between the inner tube and an outer tube using a compressor. At this time, the wind velocity of air from the small holes was 350 m/sec. This tube was disposed just under the rotary cutter, and further, a taper tube was welded to a lower portion thereof. A matrix resin was supplied from a side face of the taper tube. As this matrix resin, there were used particles obtained by freeze-pulverizing pellets of a polycarbonate, "Panlite" (registered trade mark) L-1225L manufactured by Teijin Chemicals Ltd., followed by further classification through a 20 mesh and a 100 mesh. The average particle size of the polycarbonate powder was about 710 µm. Next, a table movable in XY directions was installed under an outlet of the taper tube, and suctioning was performed from a lower portion of the table with a blower. Then, the supply amount of the reinforcing fibers was set to 1,200 g/min, and the supply amount of the matrix resin was set to 1,600 g/min. The system was operated to obtain a random mat in which the reinforcing fibers and the thermoplastic resin were mixed. The configuration of the reinforcing fibers in the random mat was observed. As a result, the fiber axes of the reinforcing fibers were approximately parallel to a plane, and randomly dispersed in the plane. The average fiber length of the reinforcing fibers of the resulting random mat was 8 mm, and the fiber areal weight of fibers was 1,200 g/m².

For the resulting random mat, the ratio of the reinforcing fiber bundles (A) and the average number (N) of fibers were examined. As a result, the critical single fiber number defined by formula (1) was 86. For the reinforcing fiber bundles (A), the ratio thereof to the total amount of fibers in the mat was 38%, and the average number (N) of fibers in the reinforcing fiber bundles (A) was 220. Further, the polycarbonate powder was dispersed in the reinforcing fibers in a state having no large unevenness.

The resulting random mat was heated in a press machine heated at 300° C., at 1 MPa for 3 minutes to obtain a molded plate having a thickness of 1.9 mm. For the resulting molded plate, an ultrasonic inspection was performed. As a result, a non-impregnated portion or a void was not recognized.

The tensile modulus of the resulting molded plate in 0-degree and 90-degree directions were measured. As a result, the ratio (Eδ) of the elasticity was 1.02, and fiber orientation was scarcely observed. Thus, the material in which isotropy was maintained could be obtained. Further, this molded plate was heated in a furnace at 500° C. for about 1 hour to remove the resin, and the average fiber length of the reinforcing fibers was determined. As a result, it was 8 mm. The resin was removed from the molded plate, and the ratio of the reinforcing fiber bundles (A) and the average number (N) of fibers were examined. As a result, differences from the above-mentioned measurement results of the random mat were not observed.

Example 6

As reinforcing fibers, there were used carbon fiber strands, "Tenax" (registered trade mark) STS40-24KS (average fiber diameter: 7 µm, strand width: 10 mm, tensile strength: 4,000 MPa) manufactured by Toho Tenax Co., Ltd., which was widened to a width of 30 mm. For splitting the widened strand, there was used a slitter in which disc-like blades prepared using a cemented carbide were arranged at 1-mm intervals. As a cutting device, there was used a rotary cutter in which a spiral knife was arranged on a surface thereof, using a cemented carbide. At this time, θ in the above-mentioned formula (3) was 45 degrees, and the pitch of blades was adjusted to 30 mm so as to cut the reinforcing fibers to a fiber length of 30 mm. For preparing a fiber opening device, SUS 304-made nipples different in diameter were welded to prepare a double tube and small holes were made in an inner tube. Compressed air was supplied between the inner tube and an outer tube of the device using a compressor. At this time, the wind velocity of air from the small holes was 350 m/sec. This tube was disposed just under the rotary cutter, and further, a taper tube was welded to a lower portion thereof. A matrix resin was supplied from a side face of the taper tube. As this matrix resin, there were used particles obtained by freeze-pulverizing pellets of a polycarbonate, "Panlite" (registered trade mark) L-1225L manufactured by Teijin Chemicals Ltd., followed by further classification through a 20 mesh and a 100 mesh. The average particle size of the polycarbonate powder was about 710 µm. Next, a table movable in XY directions was installed under an outlet of the taper tube, and suctioning was performed from a lower portion of the table with a blower. Then, the supply amount of the reinforcing fibers was set to 500 g/min, and the supply amount of the matrix resin was set to 550 g/min. The system was operated to obtain a random mat in which the reinforcing fibers and the thermoplastic resin were mixed. The configuration of the reinforcing fibers in the random mat was observed. As a result, the fiber axes of the reinforcing fibers were approximately parallel to a plane, and randomly dispersed in the plane. The average fiber length of the reinforcing fibers of the resulting random mat was 30 mm, and the fiber areal weight of fibers was 500 g/m².

For the resulting random mat, the ratio of the reinforcing fiber bundles (A) and the average number (N) of fibers were examined. As a result, the critical single fiber number defined by formula (1) was 86. For the reinforcing fiber bundles (A), the ratio thereof to the total amount of fibers in the mat was 35%, and the average number (N) of fibers in the reinforcing fiber bundles (A) was 270. Further, the polycarbonate powder was dispersed in the reinforcing fibers in a state having no large unevenness.

Four layers of the resulting random mat were stacked, and heated in a press machine heated at 300° C., at 1 MPa for 3 minutes to obtain a molded plate having a thickness of 3.0 mm. For the resulting molded plate, an ultrasonic inspection was performed. As a result, a non-impregnated portion or a void was not recognized.

The tensile of modulus of the resulting molded plate in 0-degree and 90-degree directions were measured. As a result, the ratio (Eδ) of the tensile modulus was 1.02, and fiber orientation was scarcely observed. Thus, the material in which isotropy was maintained could be obtained. Further, this molded plate was heated in a furnace at 500° C. for about 1 hour to remove the resin, and the average fiber length of the reinforcing fibers was determined. As a result, it was 30 mm. The resin was removed from the molded plate, and the ratio of the reinforcing fiber bundles (A) and the average number (N) of fibers were examined. As a result, differences from the above-mentioned measurement results of the random mat were not observed.

Example 7

As reinforcing fibers, there were used carbon fiber strands, "Tenax" (registered trade mark) STS40-24KS (average fiber diameter: 7 μm, strand width: 10 mm) manufactured by Toho Tenax Co., Ltd., which was widened in width to 30 mm. As a fiber separating device, there was used a slitter in which disc-like blades prepared using a cemented carbide were arranged at 0.5-mm intervals. As a cutting device, there was used a rotary cutter in which a spiral knife made of cemented carbide was arranged on a surface thereof. At this time, θ in the above-mentioned formula (3) was 45 degrees, and the pitch of blades was adjusted to 30 mm so as to cut the reinforcing fibers to a fiber length of 30 mm.

A strand which passed through the cutter was introduced into a flexible conveying pipe disposed just under the rotary cutter, followed by introduction thereof into a fiber opening device. As the fiber opening device, a double tube prepared by welding SUS 304-made nipples different in diameter was used. Small holes were made in an inner tube of the double tube, and compressed air was supplied between the inner tube and an outer tube using a compressor. At this time, the wind velocity of air from the small holes was 100 m/sec. A taper tube increased in diameter downwardly was welded to a lower portion of this tube.

From a side face of the taper tube, a nylon resin, "A1030" manufactured by Unitika Ltd., was supplied as a matrix resin. Then, a breathable support (hereinafter referred to as a fixing net) movable in a given direction was installed under an outlet of the taper tube, and suctioning was performed from a lower portion thereof with a blower. A mixture of the cut reinforcing fibers and the nylon resin was deposited in band form on that fixing net while reciprocating the flexible conveying pipe and the taper tube in the width direction. Then, the supply amount of the reinforcing fibers was set to 500 g/min, and the supply amount of the matrix resin was set to 530 g/min. The system was operated to obtain a random mat in which the reinforcing fibers and the thermoplastic resin were mixed, on the support. The configuration of the reinforcing fibers in the random mat was observed. As a result, the fiber axes of the reinforcing fibers were approximately parallel to a plane, and randomly dispersed in the plane. The average fiber length of the reinforcing fibers of the resulting random mat was 30 mm, and the fiber areal weight of fibers was 500 g/m².

For the resulting random mat, the ratio of the reinforcing fiber bundles (A) and the average number (N) of fibers were examined. As a result, the critical single fiber number defined by formula (1) was 86. For the reinforcing fiber bundles (A), the ratio thereof to the total amount of fibers in the mat was 85%, and the average number (N) of fibers in the reinforcing fiber bundles (A) was 370. Further, the nylon powder was being dispersed in the reinforcing fibers in a state having no large unevenness.

Two layers of the resulting random mat were stacked, and heated in a press machine heated at 260° C., at 1 MPa for 3 minutes to obtain a molded plate having a thickness of 1.5 mm. For the resulting molded plate, an ultrasonic inspection was performed. As a result, a non-impregnated portion or a void was not confirmed.

The tensile modulus of the resulting molded plate in 0-degree and 90-degree directions were measured. As a result, the ratio (Eδ) of the elasticity was 1.03, and fiber orientation was scarcely observed. Thus, the material in which isotropy was maintained could be obtained. Further, this molded plate was heated in a furnace at 500° C. for about 1 hour to remove the resin, and the average fiber length of the reinforcing fibers was determined. As a result, it was 30 mm. The resin was removed from the molded plate, and the ratio of the reinforcing fiber bundles (A) and the average number (N) of fibers were examined. As a result, differences from the above-mentioned measurement results of the random mat were not observed.

Comparative Example 1

A random mat was prepared in the same manner as in Example 1 with the exception that the wind velocity of air from the small holes was adjusted to 50 m/sec. The configuration of the reinforcing fibers in the random mat was observed. As a result, the fiber axes of the reinforcing fibers were approximately parallel to a plane, and randomly dispersed in the plane.

For the resulting random mat, the ratio of the reinforcing fiber bundles (A) and the average number (N) of fibers were examined. As a result, the critical single fiber number defined by formula (1) was 86. For the reinforcing fiber bundles (A), the ratio thereof to the total amount of fibers in the mat was 95%, and the average number (N) of fibers in the reinforcing fiber bundles (A) was 1,500.

The reinforcing fiber bundles of the resulting random mat were thick, and a molded plate was prepared using this random mat in the same manner as in Example 1, and subjected to the ultrasonic inspection. As a result, a non-impregnated portion was confirmed. Further, the molded plate was cut, and a cross-section thereof was observed. As a result, a portion not impregnated with the resin was confirmed in the inside of the fiber bundle.

Comparative Example 2

A random mat obtained in the same manner as in Comparative Example 1 was heated in a press machine heated at 300° C., at a pressure elevated to 4 MPa for 3 minutes to obtain a molded plate. The resulting molded plate was nearly doubled in area, and the thickness thereof was reduced by nearly half to about 0.3 mm. In the resulting molded plate, a fiber flow could be visually confirmed. The tensile modulus of the resulting molded plate in a flow direction and a 90-degree direction to the flow direction were measured. As a result, the ratio (Eδ) of the elasticity was 2.33, and it was confirmed that the fibers were largely oriented. Further, this molded plate was heated in a furnace at 500° C. for about 1 hour to remove the resin, and thereafter, the ratio of the reinforcing fiber bundles (A) and the average number (N) of fibers were examined. As a result, differences from the measurement results of the random mat described in Comparative Example 1 were not observed.

DESCRIPTION OF REFERENCE NUMERALS AND SIGNS

1: Reinforcing fiber
2: Pinch roller
3: Rubber roller
4: Main body of a rotary cutter
5: Blade
6: Cut reinforcing fiber
7: Pitch of blades
8: Blade parallel to a fiber direction

What is claimed is:

1. A random mat comprising: carbon fibers having an average fiber length of 5 to 100 mm; and a thermoplastic resin, wherein a fiber areal weight of the carbon fibers is from 25 to 3,000 g/m²,
the random mat comprises a carbon fiber bundle (A) in a ratio of from 30 vol % to less than 90 vol % to a total amount of the carbon fibers, the carbon fiber bundle (A) including the carbon fibers of a critical single fiber number defined by formula (1) or more, and an average number (N) of single carbon fibers in the carbon fiber bundle (A) satisfies formula (2):

$$\text{Critical single fiber number} = 600/D \tag{1}$$

$$0.7 \times 10^4/D^2 < N < 1 \times 10^5/D^2 \tag{2}$$

wherein D is an average single fiber diameter (μm) of the carbon fiber bundle (A).

2. The random mat according to claim 1, wherein an existing amount of the thermoplastic resin in the random mat is from 50 to 1,000 parts by weight based on 100 parts by weight of the carbon fibers.

3. The random mat according to claim 1, wherein the thermoplastic resin is present in fibrous or particulate form.

4. A method for producing a random mat according to claim 1, comprising:

cutting a carbon fiber bundle;

introducing the cut carbon fiber bundle into a tube, and opening the carbon fiber bundle by blowing air thereto in the tube;

spreading and concurrently suctioning the opened carbon fibers, together with a fibrous or particulate thermoplastic resin, and spraying the carbon fibers and the thermoplastic resin onto a fixing part and;

fixing the cut carbon fibers and the thermoplastic resin which are sprayed to form a random mat comprising carbon fibers having an average fiber length of 5 to 100 mm; and a thermoplastic resin, wherein a fiber areal weight of the carbon fibers is from 25 to 3,000 g/m$^2$, the random mat comprises a carbon fiber bundle (A) in a ratio of from 30 vol % to less than 90 vol % to a total amount of the carbon fibers, the carbon fiber bundle (A) including the carbon fibers of a critical single fiber number defined by formula (1) or more, and an average number (N) of single carbon fibers in the carbon fiber bundle (A) satisfies formula (2):

$$\text{Critical single fiber number} = 600/D \tag{1}$$

$$0.7 \times 10^4/D^2 < N < 1 \times 10^5/D^2 \tag{2}$$

wherein D is an average single fiber diameter (μm) of the carbon fiber bundle (A).

5. A carbon fiber reinforced composite material obtained by molding the random mat according to claim 1.

* * * * *